United States Patent
Sahay

(10) Patent No.: US 10,375,465 B2
(45) Date of Patent: Aug. 6, 2019

(54) SYSTEM AND METHOD FOR ALERTING A USER OF PREFERENCE-BASED EXTERNAL SOUNDS WHEN LISTENING TO AUDIO THROUGH HEADPHONES

(71) Applicant: Harman International Industries, Inc., Stamford, CT (US)

(72) Inventor: Pratyush Sahay, Karnataka (IN)

(73) Assignee: Harman International Industries, Inc., Stamford, CT (US)

( * ) Notice: Subject to any disclaimer, the term of this patent is extended or adjusted under 35 U.S.C. 154(b) by 221 days.

(21) Appl. No.: 15/265,092

(22) Filed: Sep. 14, 2016

(65) Prior Publication Data
US 2018/0077483 A1 Mar. 15, 2018

(51) Int. Cl.
*H04R 1/10* (2006.01)
*G10L 15/18* (2013.01)
*G10L 15/26* (2006.01)
*G10L 21/0364* (2013.01)

(52) U.S. Cl.
CPC ........ H04R 1/1083 (2013.01); G10L 15/1822 (2013.01); *G10L 15/26* (2013.01); *G10L 21/0364* (2013.01)

(58) Field of Classification Search
CPC ............. H04R 1/1041; H04R 2420/07; H04R 2430/01; H04R 5/033; H04R 1/028; H04R 1/1091; H04R 2460/03; H04R 5/04; H04R 1/1008; H04R 1/1016; H04R 1/1025; H04R 1/1058; H04R 1/1083; H04R 2420/01; H04R 2499/13; H04R 29/00; H04R 1/10

USPC ........................ 381/105, 107, 364, 56, 8, 74
See application file for complete search history.

(56) References Cited

U.S. PATENT DOCUMENTS

| 5,647,011 A | 7/1997 | Garvis |
| 8,326,635 B2* | 12/2012 | Usher ............... G10L 13/00 704/258 |
| 9,357,320 B2* | 5/2016 | Gelter ............... H04R 29/00 |
| 9,398,367 B1 | 7/2016 | Scott et al. |
| 2007/0092087 A1* | 4/2007 | Bothra ............. H04M 1/6058 381/74 |
| 2007/0116316 A1 | 5/2007 | Goldberg |

(Continued)

OTHER PUBLICATIONS

Singh et al, "Speech in Noisy Environments: Robust Automatic Segmentation, Feature Extraction, and Hypothesis Combination", Department of Electrical and Computer Engineering and School of Computer Science, Carnegie Mellon University, Pittsburgh, PA, 4 pages.

*Primary Examiner* — Akelaw Teshale
(74) *Attorney, Agent, or Firm* — Brooks Kushman P.C.

(57) ABSTRACT

A computer-program product embodied in a non-transitory computer readable medium that is programmed to communicate with a listener of headphones is provided. The computer-program product includes instructions to receive ambient noise indicative of external noise to a listener's headphone and to extract a speech component from the ambient noise. The computer-program product further includes instructions to derive an intent from the speech component of the ambient noise and compare the intent to at least one user defined preference. The computer-program product further including instructions to transmit an alert to notify a listener that the intent of the speech component matches the at least one user defined preference.

18 Claims, 4 Drawing Sheets

(56) References Cited

U.S. PATENT DOCUMENTS

| | | | |
|---|---|---|---|
| 2008/0101627 A1* | 5/2008 | Lin | G01H 3/14 381/94.7 |
| 2010/0046767 A1* | 2/2010 | Bayley | G01H 3/14 381/59 |
| 2010/0076793 A1* | 3/2010 | Goldstein | G06F 21/10 705/4 |
| 2014/0064511 A1* | 3/2014 | Desai | H04R 1/1041 381/74 |
| 2014/0376728 A1* | 12/2014 | Ramo | G06T 19/006 381/56 |
| 2015/0170645 A1 | 6/2015 | Di Censo et al. | |
| 2015/0222977 A1* | 8/2015 | Angel, Jr. | H04R 1/105 381/74 |
| 2015/0332564 A1* | 11/2015 | Weinberg | G08B 6/00 340/407.1 |
| 2016/0381450 A1* | 12/2016 | Taite | G08B 3/10 381/74 |

\* cited by examiner

SYSTEM AND METHOD FOR ALERTING A USER OF PREFERENCE-BASED EXTERNAL SOUNDS WHEN LISTENING TO AUDIO THROUGH HEADPHONES

TECHNICAL FIELD

Aspects disclosed herein generally relate to a system and method for alerting a user of preference-based external sounds (or user-defined audio preferences) when listening to audio through headphones. These aspects and others will be discussed in more detail herein.

BACKGROUND

Current headphones may be considered to be "blind systems." For example, when a listener listens to audio above a certain volume that is played back through the headphones, the user is generally not able to hear any external or ambient sound irrespective of the type and importance of the external sound that is present in the environment-context (i.e., user's current environment—public transport, shopping mall, etc.)/social-context (i.e., type of callouts may vary depending upon the user's current role—office, home, etc.) in which the user is situated during audio playback.

There may be certain external sounds such as announcements that are transmitted as ambient sounds such as in public places, or during emergency scenarios or call-outs from certain individuals that the user may be interested in hearing even when experiencing media through the headphones. Further, the preference of "the external sound of interest" may vary from person to person based on that respective person's (i) preference, (ii) environmental-context, or (iii) social-context. Alerting the user of the presence of such preferred external sounds may not be possible when listening to media through current headphones.

SUMMARY

A computer-program product embodied in a non-transitory computer readable medium that is programmed to communicate with a listener of headphones is provided. The computer-program product includes instructions to receive ambient noise indicative of external noise to a listener's headphones and to extract a speech component from the ambient noise. The computer-program product further includes instructions to derive an intent from the speech component of the ambient noise and compare the intent to at least one user defined preference. The computer-program product further includes instructions to transmit an alert to notify a listener that the intent of the speech component matches the at least one user defined preference.

An apparatus for alerting a listener of an external sound of interest while listening to headphones is provided. The apparatus includes a server programmed to receive ambient noise indicative of external noise to headphones from a mobile device and to extract a speech component from the ambient noise. The server is programmed to derive an intent from the speech component of the ambient noise and to compare the intent to at least one user defined preference. The server is programmed to transmit an alert to notify a listener that the intent of the speech component matches the at least one user defined preference.

An apparatus for alerting a listener of an external sound of interest while listening to headphones. The apparatus includes a mobile device programmed to transmit ambient noise indicative of external noise to headphones to a server and to receive an alert from the server in response to extracted speech on the ambient noise providing an intent that matches at least one user defined preference. The mobile device is programmed to audibly or visually notify a user of the headphones that the intent of the extracted speech matches the at least one user defined preference in response to the alert.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium programmed to perform any number of the functions as disclosed.

Aspects disclosed herein provide for a system that captures an "external sound of interest" that is preferred by a particular user when listening to media through headphones. The system further provides an alert to the user regarding the preferred external sound in the user's preferred format (e.g., an audible alert or a text notification). Further, the system incorporates a machine learning block that, among other things, learns a user-preference model regarding the various types of "external sounds of interest" that a particular user shows interest in and recommends adding a new rule based on the user's environmental-context, social-context or location. The system may be incorporated in connection with active noise-cancelling headphones. However, the system may also be extended to any headphone that has an active microphone (e.g., which is in an 'on' state while media is being streamed into the headphones) to capture the external sounds.

Figure 1:
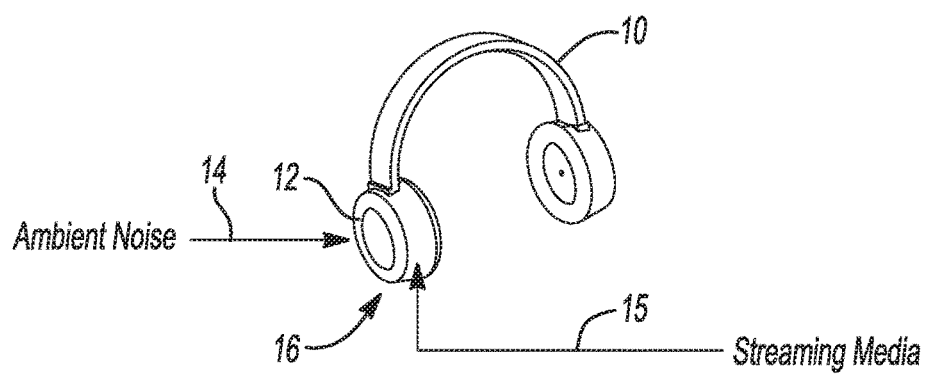
FIG. 1 generally depicts an example of active noise-cancelling headphones that may capture external sounds of interest and other aspects disclosed in connection with the system as illustrated in FIG. 3.
Figure 2:
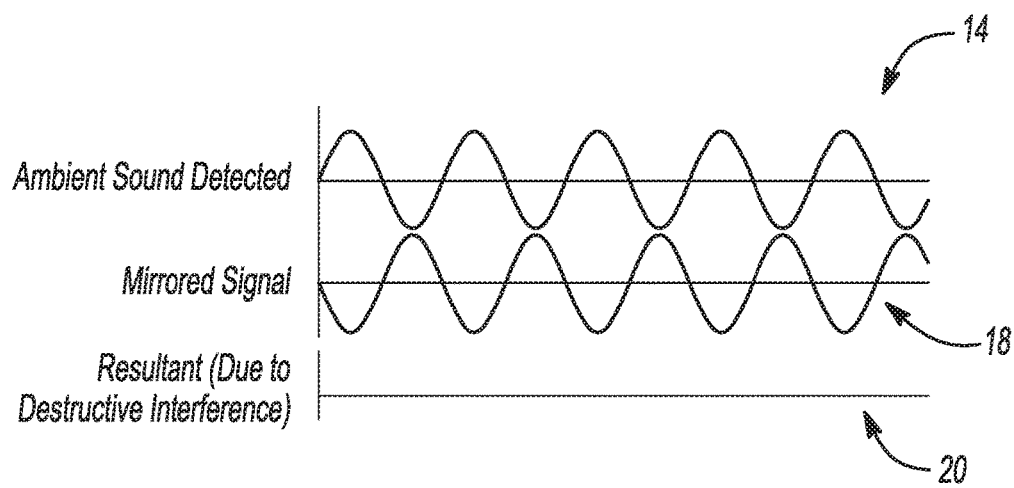
FIG. 2 generally depicts a plot including waveforms utilized in connection with the active noise-cancelling headphone of FIG. 1.
Figure 3:
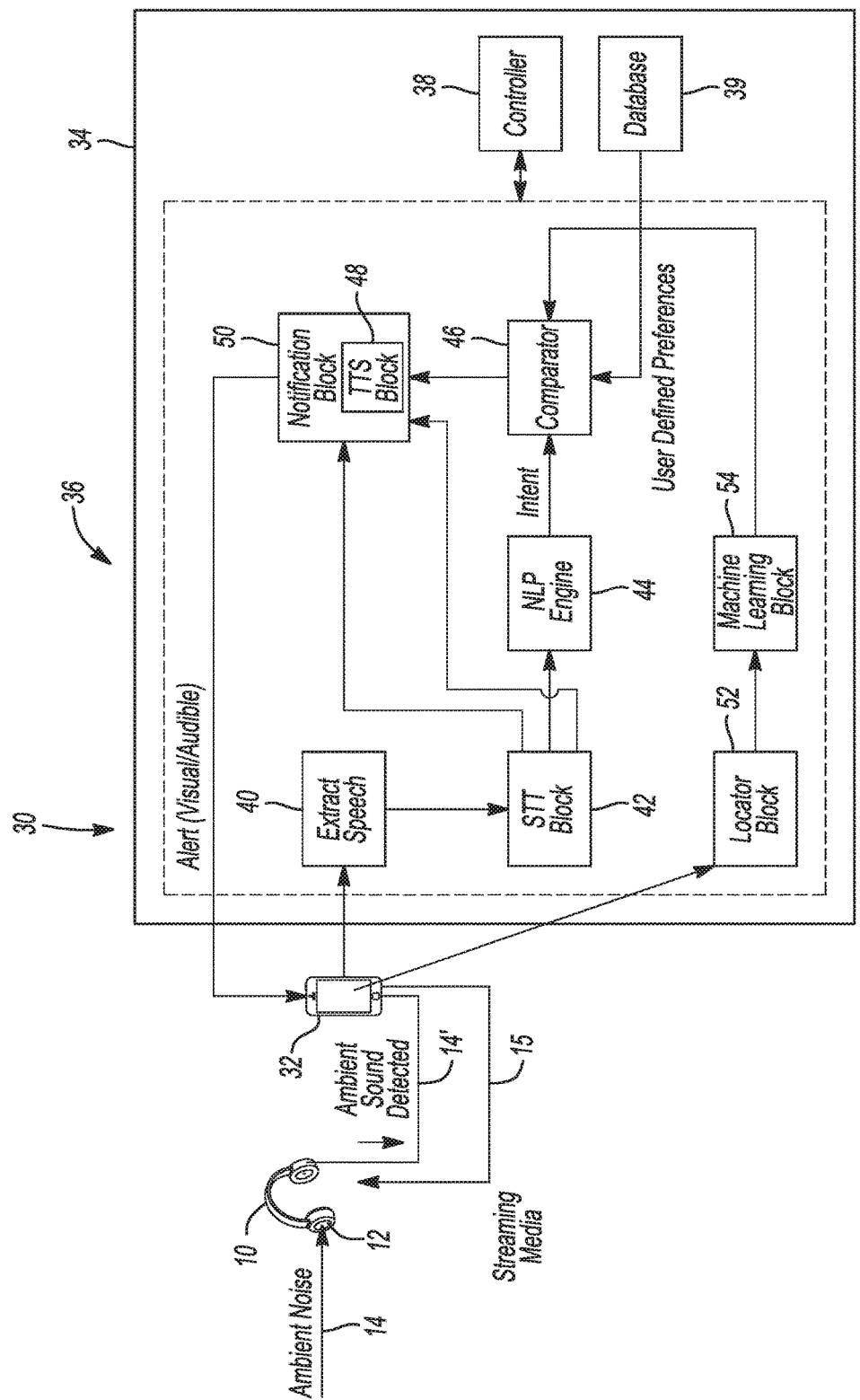
FIG. 3 depicts a system for alerting a user of preference-based external sound(s) when listening to audio.

FIG. 1 discloses an example of headphones 10 that may capture external sounds of interest and other aspects disclosed in connection with the system as illustrated in FIG. 3. In one example, the headphones 10 may be implemented as active noise cancelling headphones. The headphones 10 generally include at least one microphone 12 for sensing ambient noise 14 exterior to the headphones 10 during audio playback of media (e.g., see streaming media signal 15 that is received at the headphones 10). Additionally, the headphones 10 generally include noise-cancelling circuitry 16 for generating and emitting a mirrored signal 18 (or inverse signal, or out of phase signal) (see FIG. 2)) to cancel the sensed ambient noise 14. As shown, the mirrored signal 18 is generally 180 degrees out of phase with the ambient noise 14. The headphones 10 transmit the mirrored signal 18 to the user's headphone 10 to cancel the external ambient noise 14 that is sensed at the microphones 12. A resultant signal 20 (see FIG. 2) is provided which illustrates that the mirrored signal 18 essentially cancels out the ambient noise 14 (e.g., the resultant signal has no amplitude or phase) such that the user listens to the media free of any disturbance of the ambient noise 14. While this is generally preferable, certain external sounds within the ambient noise 14 may be of interest to the user.

FIG. 3 depicts a system 30 for alerting a user of preference-based external sound(s) when listening to audio (or the streaming media 15). The system 30 generally includes the headphones 10, a mobile device 32, and an alert generation block 34. The mobile device 32 may be implemented as a cellular telephone, laptop, computer, tablet computer, etc. The mobile device 32 may be arranged as an audio source and provide the streaming media signal 15 to the headphones 10. The headphones 10 may then audibly playback the media in response to receiving the streaming media signal 15. The headphones 10 and the mobile device 32 may be hardwired coupled via an audio cable (not shown). Alternatively, the headphones 10 and the mobile device 32 may be wirelessly coupled to one another and engage in data transfer via Bluetooth®, WiFi, etc.

As noted above, the headphones 10 include a microphone 12 for receiving the ambient noise 14 from the environment external to the headphones 10. The headphones 10 may transmit the sensed or received ambient noise 14' to the mobile device 32. While in the noted example, the mobile device 32 may transmit the streaming media signal 15 and the received ambient noise 14', it is recognized that the mobile device 32 may not necessarily be the device that provides the streaming media signal 15 as the user may use a separate audio source (not shown) to provide streaming media signal 15.

The alert generation block 34 is generally configured to process the received ambient noise 14' and transmit an alert to the user via the mobile device 32 in the event the received ambient noise 14' includes an audible signature that is of interest to the user (i.e., an external sound of interest). The external sounds of interest may correspond to various rules as set up by the user. For example, the external sounds of interest (or "user defined preferences") may include, but are not limited to, detected words such as "bus, train, bus stop, train station, timings, emergency, alert, public, "user name," nick-name, father, son, mother, daughter, etc. The mobile device 32 enables the user to input (voice or touch input) and to update any of the external sounds of interest in a database 39 (or memory) (not shown). The external sounds of interest may be generally defined as user-defined preferences and may be modified as the user desires. This aspect may enable the user to change the user-defined preferences based on any dynamic change in the user's location, environmental-context or social-context. It is recognized that the alert generation block 34 may be located on the mobile device 32. Alternatively, the alert generation block 34 may be located on a server 36 that is remote from the mobile device 32. Assuming for purposes of explanation that the alert generation block 34 is on the server 36, the mobile device 32 wirelessly transmits the received ambient noise 14' to the alert generation block 34. Likewise, the mobile device 32 is configured to transmit the user-defined preferences to the alert generation block 34 for storage on the database 39.

The alert generation block 34 generally includes at least one controller 38 (or at least one microprocessor) (hereafter controller 38), a speech extraction block 40, a speech-to-text (STT) block 42, a natural language processing (NLP) engine 44, a comparator 46, a text-to-speech (TTS) block 48, a notification block 50, a locator block 52, and a machine learning block 54. The speech extraction block 40 receives the ambient noise 14' from the mobile device 32 and is configured to extract a dominant voice (or speech) signal that may be present in the received ambient noise 14'. One example of the manner in which speech may be extracted from an audio signal is set forth in "SPEECH IN NOISY ENVIRONMENTS: ROBUST AUTOMATIC SEGMENTATION, FEATURE EXTRACTION, AND HYPOTHESIS COMBINATION" May 7, 2001 IEEE International Conference on Acoustics, Speech and Signal Processing, by Rita Singh, Michael L. Seltzer, Bhiksa Raj, and Richard M. Stern, Department of Electrical and Computer Engineering and School of Computer Science, Carnegie Mellon University which is hereby incorporated by reference in its entirety. If the speech extraction block 40 detects the presence of speech in the ambient noise 14', the dominant voice component (i.e., detected) speech is transmitted to the STT block 42. The STT block 42 converts the detected speech into text and the text is then transmitted to the NLP engine 44. The NLP engine 44 then determines the intent (i.e., basic purpose or intention) of the text and outputs the same to the comparator 46. Since there exist humongous ways in which a 'purpose' or 'intent' could be spoken, the NLP engine 44 may extract the base purpose included in the spoken sentence. As an example, consider the different variations surrounding the intent behind "How are you?". Different ways to speak this could include—"How are you doing?", "What's going on with you?", "Howdy?", etc. The NPL engine 44 is arranged to identify the same base purpose for the noted different ways of how these questions are spoken.

The comparator 46 compares the intent against the various user-defined preferences received from the mobile device 32. As noted above, the user-defined preferences are generally defined as preferences that are set up by the user of the headphones 10 that correspond to detected speech in the ambient sound 14' at the headphones 10 that warrants generating an alert to notify the user of the headphones 10 while the user is engaged with audio playback at the headphones 10. The user may input, establish and/or store the user-defined preferences at any time on the alert generation block 34 via the mobile device 32. If the comparator 46 detects a match between the intent and the available user defined preferences, then the comparator 46 outputs a signal to control the notification block 50 to provide an alert (e.g., visual and/or audible) to the mobile device 32 and/or the headphones 10. The user has the option of transmitting the alert in either a visual format or an audible format. The alert that is transmitted to the mobile device 32 is as per what the user added while entering the user-preference rules in the audible format assuming the audible format is elected. For example, the user may have added a rule (a) if text "contains my name", then play "You were called-out", (b) if text contains "XYZ bus stop", then play "you have reached your destination", etc. In this case, the TTS block 48 may provide an audible format of "You were called-out" or "You have reached your destination" if this is setup by the user as a user-defined preference. Alternatively, if the user elects to transmit the alert in a visual format, the notification block 50 receives the text (in the digitized format) from the STT block 42 and transmits the same to the mobile device 32 where the mobile device 32 then visually presents the text to the user on a display thereof. For example, the notification block 50 transmits the alert "You were called-out" or "You have reached your destination" if this is the selected video (or text notification) to be displayed to the user as defined by the user-defined preferences.

In general, the alert generation block 34 is configured to transmit a plurality of alerts over time to the mobile device 32. The mobile device 32 is configured to arrange a listing of alerts and corresponding dates/time in which such alerts were received and is further configured to enable the user to read/listen to the alerts at his/her preference. The locator block 52 is generally configured to determine the location, activity, and/or upcoming tasks from the mobile device 32. In one example, the locator block 52 may determine the location of the mobile device 32 (and the user) based on global positioning satellite (GPS) coordinates and/or mobile base station coordinates that are provided by the mobile device 32 to the alert generation block 34. The locator block 52 may include various hardware sensors (not shown) such as, but not limited to, a GPS sensor, an accelerometer, a gyroscope and/or a magnetic sensor. The data from the noted hardware sensors may aid in identifying a particular activity that the user is engaged in. For example, the user may be involved in a physical activity such as sitting, walking, moving in a vehicle, etc. Knowledge of the user's activity may aid in correlating the user defined preferences and the type of physical activity that the user is involved with. The database 39 receives and stores information pertaining to the user's calendar and e-mails that are present on the mobile device 32. The data from the calendar and emails may aid in detecting a correlation between upcoming tasks or appointments and the user-defined preferences. The information pertaining to the location of the mobile device 32 may aid in identifying at which locations the user prefers to add user-defined preferences and for the system 30 to provide additional external sounds of interest in the future at such locations. Thus, over time, the machine learning block 54 can build a user-preference model and the alert generation block 34 may then transmit signals corresponding to recommendations provided by the machine learning block 54 to add more user-defined preferences based on the location, upcoming events, environmental-context, social-context and/or user's current activity. In general, the controller 38 is programmable to execute instructions for the operations performed by the speech extraction block 40, the STT block 42, the NLP engine 44, the comparator 46, the TTS block 48, the notification block 50, the locator block 52, and the machine learning block 54.

Figure 4:
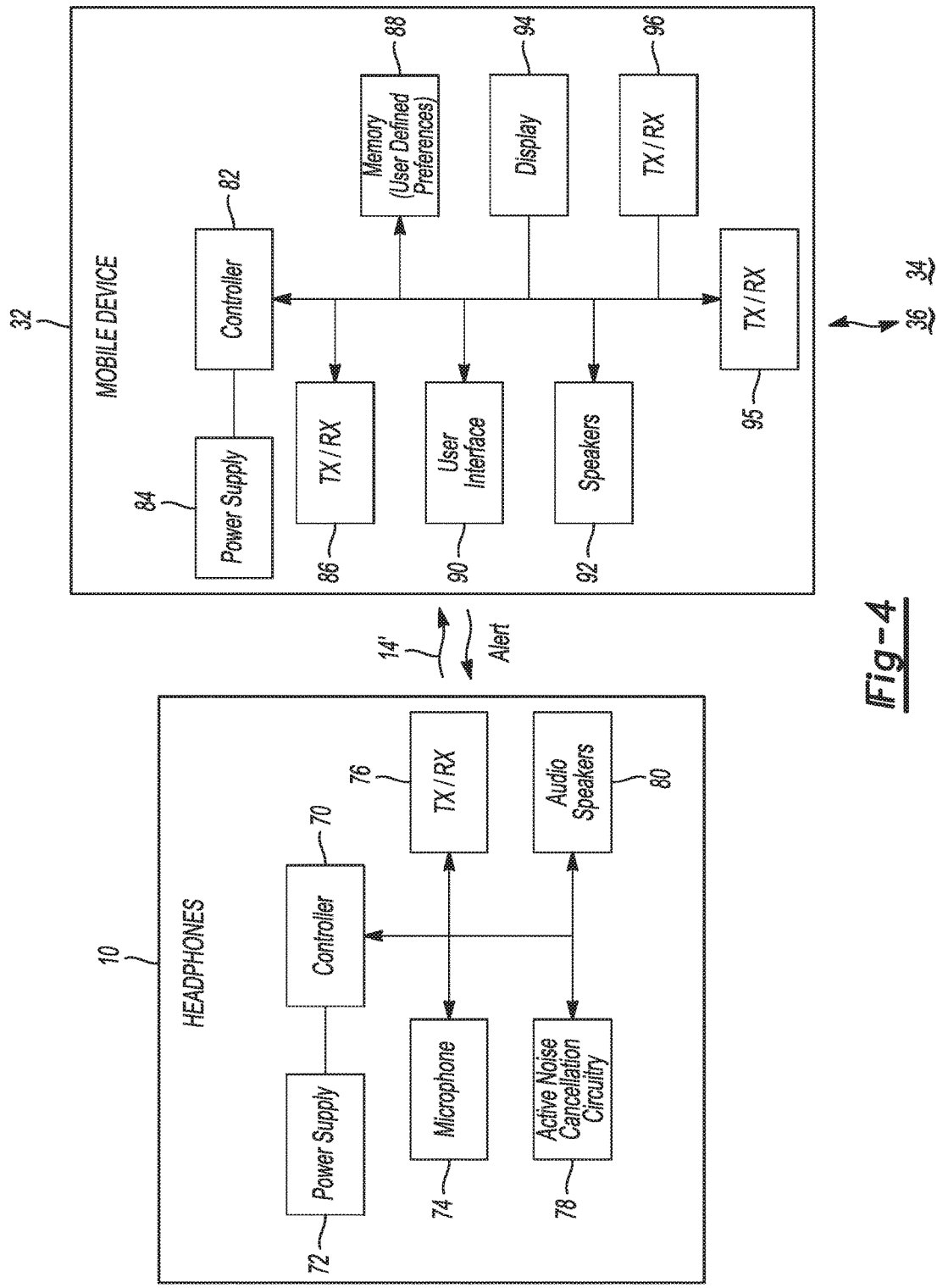
FIG. 4 generally depicts a more detailed implementation of the headphones and the mobile device in accordance to one embodiment.

FIG. 4 generally depicts a more detailed implementation of the headphones 10 and the mobile device 32 in accordance to one embodiment. The headphones 10 generally include at least one controller 70 (or at least one microprocessor) (hereafter controller 70), a power/battery supply 72, a microphone 74, a transceiver 76, active noise cancellation circuitry 78, and speaker(s) 80. The power supply 72 powers the headphones 10 (e.g., the electrical devices located within the headphones 10). The microphone 74 receives ambient noise 14 external to the headphones 10 and the active noise cancellation circuitry 78 generates the mirrored signal 18 (see FIG. 2) that is out of phase with respect to the received ambient noise 14. The controller 70 and the active noise cancellation circuitry 78 transmit the mirrored signal 18 to the speakers 80 to cancel the noise present external to the headphones 10. The transceiver 76 is configured to receive the streaming media 15 such that the speakers 80 playback the same for the user. In addition, the transceiver 76 is configured to transmit the received ambient noise 14' to the mobile device 32. It is recognized that there may be any number of transceivers 76 positioned within headphone 10. The transceiver 76 is also configured to receive the alert from the mobile device 32 assuming the alert is to be audibly played back to the user when a preferred external sound of interest is detected.

The mobile device 32 generally includes at least one controller 82 (or at least one microprocessor) (hereafter controller 82), a power/battery supply 84 (hereafter power supply 84), a first transceiver 86, memory 88, a user interface 90, speakers 92, a display 94, and a second transceiver 96. The power supply 84 powers the mobile device 32 (e.g., the electrical devices located within the mobile device 32). The first transceiver 86 is configured to receive the ambient noise 14' from the headphones 10. It is recognized that the headphone 10 and the mobile device 32 may engage in communication with one another via an audio cable, Bluetooth®, Wifi, or other suitable communication mechanism/protocol. The mobile device 32 is configured to communicate with the alert generator block 34 on the server 36 via the second transceiver 96 in the event the alert generator block 34 is not implemented within the mobile device 32. In this case, the mobile device 32 and the alert generator block 34 may engage in communication with one another also via Bluetooth®, Wifi, or other suitable communication mechanism/protocol. The mobile device 32 transmits the user-defined preferences as input by the user and stored on the memory 88 to the alert generation block 34.

The user interface 90 enables the user to enter the various user-defined preferences that are used to trigger the generation of an alert to notify the user of an external sound of interest for the user during audio playback of the headphones 10. The display 94 is configured to visually notify the user of the alert when the comparator 46 detects a match between data on the received ambient noise 14' and the user defined preference on the server 36 in the event the user selects to have the alert visually displayed.

Figure 5:
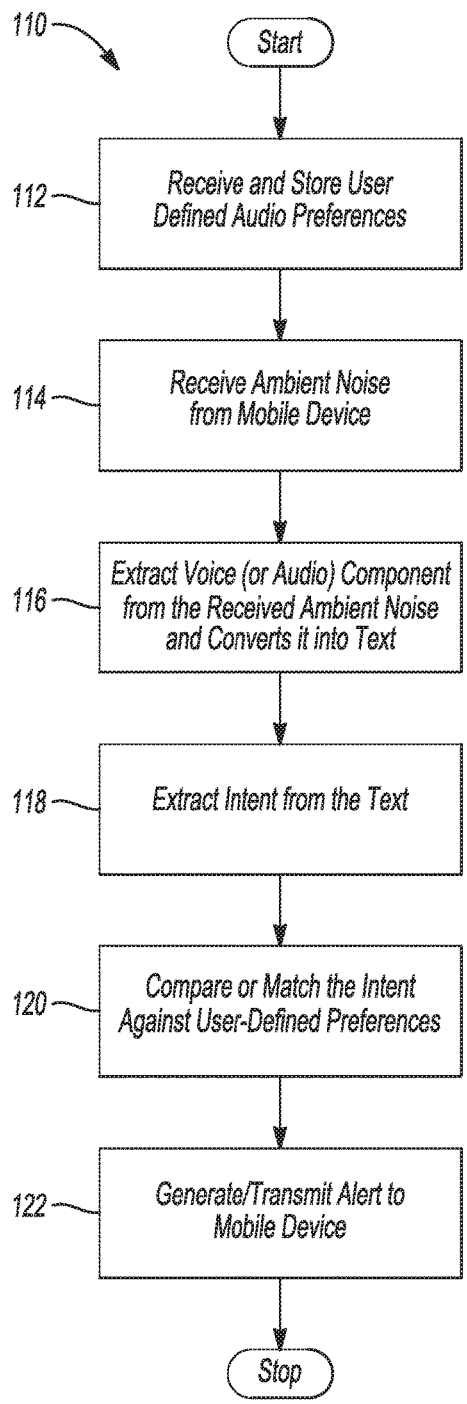
FIG. 5 generally depicts a method for alerting a user of preference-based external sounds when listening to audio through headphones in accordance to one embodiment.

FIG. 5 generally depicts a method 110 for alerting a user of external sounds of interest when listening to audio through the headphones 10 in accordance to one embodiment.

In operation 112, the alert generation block 34 receives the user-defined preferences from the mobile device 32. The alert generation block 34 stores the same on memory thereof.

In operation 114, the alert generation block 34 receives the ambient noise 14' from the mobile device 32.

In operation 116, the STT block 42 extracts the voice component (if applicable) from the received ambient noise 14' and converts this information into text. In general, the user-defined preferences as established or added as text may generally follow the format of if-then-statements. As noted above, in one example the user may add the rule if text "contains my name," then provide alert "You were called out." In another example, the user may add a rule—"if the external sound contains a sound similar to" and point this rule to a recording of a siren sound using the user interface 90 available to the user. A match between the external sound and the recorded sound results in the system 30 providing a notification/audible alert to the user.

In operation 118, the NLP engine 44 extracts the intent from the text.

In operation 120, the comparator 46 compares the intent against the various user-defined preferences and determines whether there is a match. If there is a match, then the method 110 proceeds to operation 122. If no match is found, the system 30 performs no action. The detected intent is noted or tagged by the alert generation block 34 as a rejected intent. The rejected intent is stored in the database 39. If the alert generation block 34 detects the rejected intent two or more times, then the alert generation block 34 via the machine learning block 54 flags this case and the alert generation block 34 transmits a signal to the mobile device 32 to provide an inquiry or recommendation to the user regarding interest in the rejected intent.

In operation 122, the notification block 50 transmits an alert in either an audio based format or a visual based format to the mobile device 32. The alert generation block 34 receives a signal from the mobile device 32 that indicates whether the alert generation block 34 is to transmit the alert in either the audio based format or in the visual based format. As noted above, in the event the alert generation block 34 is controlled to transmit the alert audibly, the TTS block 48 transmits the response as desired by the user or as setup within the user-defined rule to mobile device 32. In the event the alert generation block 34 is controlled to transmit a visual alert, the alert generation block 34 transmits the text as provided by the STT block 42 to the mobile device 32.

Figure 6:
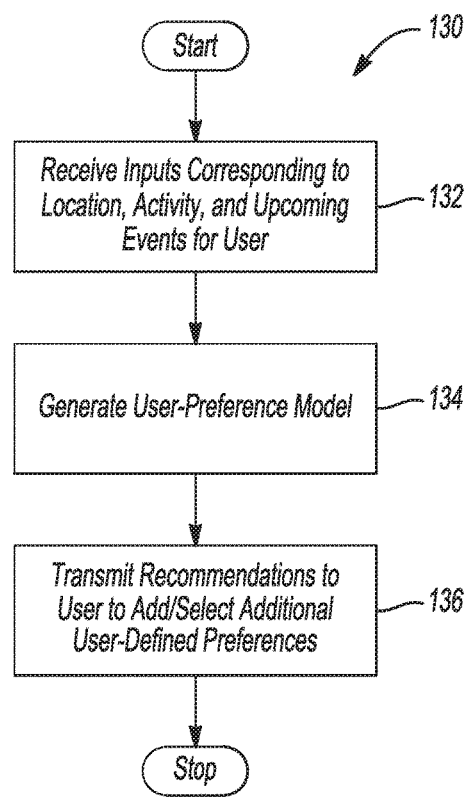
FIG. 6 generally depicts a method for generating a user preference model based on user aspects in accordance to one embodiment.

FIG. 6 depicts a method 130 for generating a user preference model based on user aspects in accordance to one embodiment.

In operation 132, the alert generation block 34 receives information corresponding to the location of the mobile device 32, activity of the user (e.g., sitting, walking, moving in a vehicle, etc), and upcoming events for the user from the mobile device 32. The alert generation block 34 stores this information on memory (not shown). The alert generation block 34 is configured to continuously receive this information from mobile device 32 for purposes of generating and updating the user preference model.

In operation 134, the machine learning block 54 dynamically generates and refines the user preference model over time based on the information. Thus, over time, the machine learning block 54 can build the user preference model and the alert generation block 34 may then transmit signals corresponding to recommendations to the mobile device 32 to add more user-defined preferences based on location, upcoming events, environmental-context, social-context and/or current user activity.

In operation 136, the alert generation block 34 may communicate various recommendations to the mobile device 32 of the user to add/select additional user-defined preferences based on the location, upcoming events, environmental-context, social-context and/or current user activity. For example, (a) if a user has added a few rules based on his/her location being office, and if the machine learning block 54 detects several but similar rejected intents while the location corresponds to an office, a recommendation is presented to the user to add the case of the rejected intent as a rule the user maybe interested in; and (b) a user has historically added a few rules based on their location being at "XYZ shopping complex", the user has a to-do list on their phone, and it shows grocery buying at the "XYZ shopping complex," then the machine learning block 54 may dynamically add "if user is near a grocery store in XYZ shopping complex", and prompt the user to complete the task if any announcement regarding grocery store is played out in "XYZ shopping complex".

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-program product embodied in a non-transitory computer readable medium that is programmed to communicate with a listener of headphones, the computer-program product comprising instructions to:
   receive ambient noise indicative of external noise to a listener's headphones;
   extract a speech component from the ambient noise;
   derive an intent from the speech component of the ambient noise;
   compare the intent to at least one user defined preference;
   transmit an alert to notify a listener that the intent of the speech component matches the at least one user defined preference;
   store the intent as a rejected intent in response to determining that the intent of the speech component does not match the at least one user defined preference; and
   transmit a signal that is indicative of an inquiry or a recommendation on interest for the rejected intent to the listener.

2. The computer-program product of claim 1 further comprising instructions to receive the at least one user defined preference corresponding to an external sound of interest in the ambient noise.

3. The computer-program product of claim 2 further comprising instructions to store the at least one user defined preference prior to comparing the intent to the at least one user defined preference.

4. The computer-program product of claim 1 further comprising instructions to convert the speech component of the ambient noise into text.

5. The computer-program product of claim 4 further comprising instruction to derive the intent from the text of the speech component of the ambient noise.

6. The computer-program product of claim 1 further comprising instructions to transmit a request to the listener to add the rejected intent as a first user defined preference.

7. The computer-program product of claim 1 wherein the instructions to transmit the alert to notify the listener further comprise instructions to transmit the alert in an audible format or a visual format to the listener.

8. The computer-program product of claim 1 further comprising instructions for determining at least one of a location, an activity, and an upcoming task for the listener.

9. The computer-program product of claim 8 further comprising instructions for generating at least one additional user defined preference in response to determining the at least one of the location, the activity, and the upcoming task for the listener.

10. An apparatus for alerting a listener of an external sound of interest while listening to headphones, the apparatus comprising:
a server programmed to:
receive ambient noise indicative of external noise to headphones from a mobile device;
extract a speech component from the ambient noise;
derive an intent from the speech component of the ambient noise;
compare the intent to at least one user defined preference; and
transmit an alert to notify a listener that the intent of the speech component matches the at least one user defined preference,
wherein the server includes memory that is programmed to store the intent as a rejected intent in response to determining that the intent of the speech component does not match the at least one user define preference, and
wherein the server is further programmed to transmit a signal that is indicative of an inquiry or a recommendation on interest for the resected intent to the listener.

11. The apparatus of claim 10 wherein the server is further programmed to receive the at least one user defined preference corresponding to an external sound of interest in the ambient noise from the mobile device.

12. The apparatus of claim 10 wherein the server includes a speech-to-text (STT) block that is programmed to convert the speech component of the ambient noise into text.

13. The apparatus of claim 12 wherein the server includes a natural language processing (NLP) block that is programmed to derive the intent from the text of the speech component.

14. The apparatus of claim 10 wherein the server is further programmed to transmit a request to the mobile device to add the rejected intent as a first user defined preference.

15. The apparatus of claim 10 wherein the server is further programmed to transmit the alert in an audible format or a visual format to the listener to the mobile device.

16. The apparatus of claim 10 wherein the server includes a locator block that is programmed to determine at least one of a location, an activity, and an upcoming task for the listener.

17. The apparatus of claim 16 wherein the server includes a machine learning block that is programmed to generate at least one additional user defined preference in response to determining the at least one of the location, the activity, and the upcoming task for the listener.

18. An apparatus for alerting a listener of an external sound of interest while listening to headphones, the apparatus comprising:
a mobile device programmed to:
transmit ambient noise indicative of external noise of headphones to a server;
receive an alert from the server in response to extracted speech on the ambient noise providing an intent that matches at least one user defined preference;
audibly or visually notify a user of the headphones that the intent of the extracted speech matches the at least one user defined preference in response to the alert; and
receive a request to add a rejected intent after determining that the intent does not match the at least one user defined preference.

* * * * *